(12) United States Patent
Li et al.

(10) Patent No.: US 11,356,498 B2
(45) Date of Patent: Jun. 7, 2022

(54) METHOD AND A DEVICE FOR SHARING A HOSTED APPLICATION

(71) Applicant: SHANGHAI ZHANGMEN SCIENCE AND TECHNOLOGY CO., LTD., Shanghai (CN)

(72) Inventors: Sinan Li, Shanghai (CN); Yuting Wang, Shanghai (CN)

(73) Assignee: SHANGHAI ZHANGMEN SCIENCE AND TECHNOLOGY CO., LTD., Shanghai (CN)

( * ) Notice: Subject to any disclaimer, the term of this patent is extended or adjusted under 35 U.S.C. 154(b) by 69 days.

(21) Appl. No.: 17/081,930

(22) Filed: Oct. 27, 2020

(65) Prior Publication Data

US 2021/0044650 A1    Feb. 11, 2021

Related U.S. Application Data

(63) Continuation of application No. PCT/CN2018/125608, filed on Dec. 29, 2018.

(30) Foreign Application Priority Data

Apr. 28, 2018   (CN) .......................... 201810403163.2

(51) Int. Cl.
*H04L 67/10*   (2022.01)
*G06F 9/54*   (2006.01)
*H04L 9/40*   (2022.01)

(52) U.S. Cl.
CPC ................ *H04L 67/10* (2013.01); *G06F 9/54* (2013.01); *H04L 63/083* (2013.01)

(58) Field of Classification Search
CPC ......... H04L 9/46; H04L 63/083; H04L 67/10; H04L 9/40; G06F 9/54
See application file for complete search history.

(56) References Cited

U.S. PATENT DOCUMENTS 9,461,935 B2 * 10/2016 Mohindra ............. G06F 9/5077
2012/0265805 A1 * 10/2012 Samdadiya ......... G06F 11/3466
709/203

(Continued)

FOREIGN PATENT DOCUMENTS

| CN | 104660678 A | 5/2015 |
| CN | 105867714 A | 8/2016 |
| CN | 108712478 A | 10/2018 |

*Primary Examiner* — Sargon N Nano
(74) *Attorney, Agent, or Firm* — Kilpatrick Townsend & Stockton, LLP

(57) ABSTRACT

The present application provides a method including acquiring, at a user equipment, a list of hosted applications returned by a network device in response to detecting an indication input for invoking a hosted application; determining a hosted application object to be shared based on the list of the hosted applications, determining a recipient for the hosted application object to be shared based on a network environment; and transmitting a request for recommendation information on the hosted application object to be shared and identification information of the recipient to the network device, so that the network device transmits corresponding recommendation information to the recipient, and the request for the recommendation information comprises identification information of the hosted application object to be shared. The hosted application is launched by detecting the indication input for invoking the hosted application, so that sharing of the hosted application object is directly triggered.

17 Claims, 2 Drawing Sheets

(56) References Cited

U.S. PATENT DOCUMENTS

| | | | |
|---|---|---|---|
| 2017/0068579 A1 | 3/2017 | Franklin et al. | |
| 2017/0310784 A1* | 10/2017 | Bourke | H04L 67/34 |
| 2021/0044650 A1* | 2/2021 | Li | H04L 67/10 |
| 2021/0256077 A1* | 8/2021 | Su | G06F 9/4484 |
| 2021/0256085 A1* | 8/2021 | Su | G06F 16/951 |
| 2021/0329079 A1* | 10/2021 | Su | H04L 67/141 |
| 2022/0043901 A1* | 2/2022 | Cui | G06F 3/0659 |

* cited by examiner

METHOD AND A DEVICE FOR SHARING A HOSTED APPLICATION

CROSS REFERENCE TO THE RELATED APPLICATION

This application is the continuation application of International Application No. PCT/CN2018/125608, filed on Dec. 29, 2018, which is based upon and claims priority to Chinese Patent Application No. 201810403163.2, filed on Apr. 28, 2018, the entire contents of which are incorporated herein by reference.

FIELD

The present application relates to computers, and more specifically relates to a method and a device for sharing a hosted application.

BACKGROUND

With the development of communication technologies and the popularization of smart user equipments, various applications (APP) have entered into people's daily lives. Hosted applications, as a type of application that can be used without downloading and installing, get a wide range of attention from all walks of life. Generally, a hosted application operates with dependence on a host application on which the hosted application is hosted, and cannot operate independently of the host application, such as an applet operating with dependence on a host application. At present, when a user needs to share a hosted application, the user has to open the hosted application at first, and then start a sharing operation from an entry for sharing the hosted application, which is inconvenient. Experience is very terrible for users who want to achieve quick sharing. Therefore, it is significantly meaningful to reduce steps of sharing and realize quick sharing.

SUMMARY

An objective of the present application is to provide a method and a device for sharing a hosted application, so as to invoke the hosted application through triggering of an indication command input, and to realize quick sharing of the hosted application.

According to an aspect of the present application, it is provided a method for sharing a hosted application at a user equipment. The method comprises: transmitting an acquisition request for a hosted application to a network device in response to detecting an indication input for invoking a hosted application, wherein the acquisition request comprises identification information of a user corresponding to the user equipment; receiving a list of hosted applications returned by the network device based on the acquisition request, wherein the list of the hosted applications comprises identification information of the hosted application; determining a hosted application object to be shared based on the list of the hosted applications; determining a recipient for the hosted application object to be shared based on a network environment; and transmitting a request for recommendation information on the hosted application object to be shared and identification information of the recipient to the network device, so that the network device transmits corresponding recommendation information to the recipient, wherein the request for recommendation information comprises identification information of the hosted application object to be shared.

According to another aspect of the present application, it is also provided a method for sharing a hosted application at a network device. The method comprises: receiving an acquisition request for a hosted application transmitted by a user equipment based on the user equipment detecting an indication input for invoking a hosted application, wherein the acquisition request comprises identification information of a user corresponding to the user equipment; performing matching of a corresponding list of hosted applications according to the identification information of the user, and returning the list of the hosted applications to the user equipment; and according to a request for recommendation information on a hosted application object to be shared and identification information of a recipient transmitted by the user equipment, transmitting recommendation information corresponding to the request for recommendation information to the recipient, wherein the request for recommendation information comprises identification information of the hosted application object to be shared, and the recipient is determined by the user equipment based on a network environment.

According to an aspect of the present application, it is also provided a computer readable medium having computer readable instructions stored thereon, the computer readable instructions being executable by a processor to implement the above-mentioned methods.

According to another aspect of the present application, it is also provided a user equipment for sharing a hosted application. The user equipment comprises: one or more processors; and a memory storing computer readable instructions, wherein the computer readable instructions, when executed, cause the processor to perform the operations of the method for sharing a hosted application at a user equipment as mentioned above.

According to yet another aspect of the present application, it is also provided a network device for sharing a hosted application. The network device comprises: one or more processors; and a memory storing computer readable instructions, wherein the computer readable instructions, when executed, cause the processor to perform the operations of the method for sharing a hosted application at a network device as mentioned above.

Compared with the prior art, the present application comprises: transmitting, at a user equipment, an acquisition request for the hosted application to a network device in response to detecting an indication input for invoking the hosted application, wherein the acquisition request comprises identification information of a user corresponding to the user equipment; receiving a list of hosted applications returned by the network device based on the acquisition request, wherein the list of the hosted applications comprises identification information of the hosted applications; determining a hosted application object to be shared based on the list of the hosted applications; determining a recipient for the hosted application object to be shared based on a network environment; and transmitting a request for recommendation information on the hosted application object to be shared and identification information of the recipient to the network device, so that the network device transmits corresponding recommendation information to the recipient, wherein the request for the recommendation information comprises identification information of the hosted application object to be shared. The hosted application is launched by detecting the indication input for invoking the hosted application, so that sharing of the hosted application object is directly triggered, which simplifies steps for sharing the hosted application and improves users' experience of sharing.

DESCRIPTIONS OF THE DRAWINGS

Other features, objects, and advantages of the present application will become more apparent by reading the detailed description of non-limiting embodiments with reference to the following drawings.

The identical or similar reference numerals in the drawings represent the identical or similar components.

DETAILED EMBODIMENTS

The application is further described in detail below with reference to the accompanying drawings.

In a typical configuration of the present application, a user equipment, a device of a service network and a trusted party all include one or more processors (CPUs), an input/output interface, a network interface and a memory.

The memory may include a non-permanent memory, a random access memory (RAM) and/or a non-volatile memory and the like in a computer-readable medium, such as a read-only memory (ROM) or a flash memory (flash RAM)). A memory is an example of a computer-readable medium.

A computer-readable medium comprises permanent and non-permanent, movable and non-movable media and may implement information storage by means of any method or technology. Information may be computer-readable instructions, data structures, program modules or other data. The examples of a computer storage medium include but are not limited to a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission medium, which can be used to store information that can be accessed by a computing device.

Figure 1:
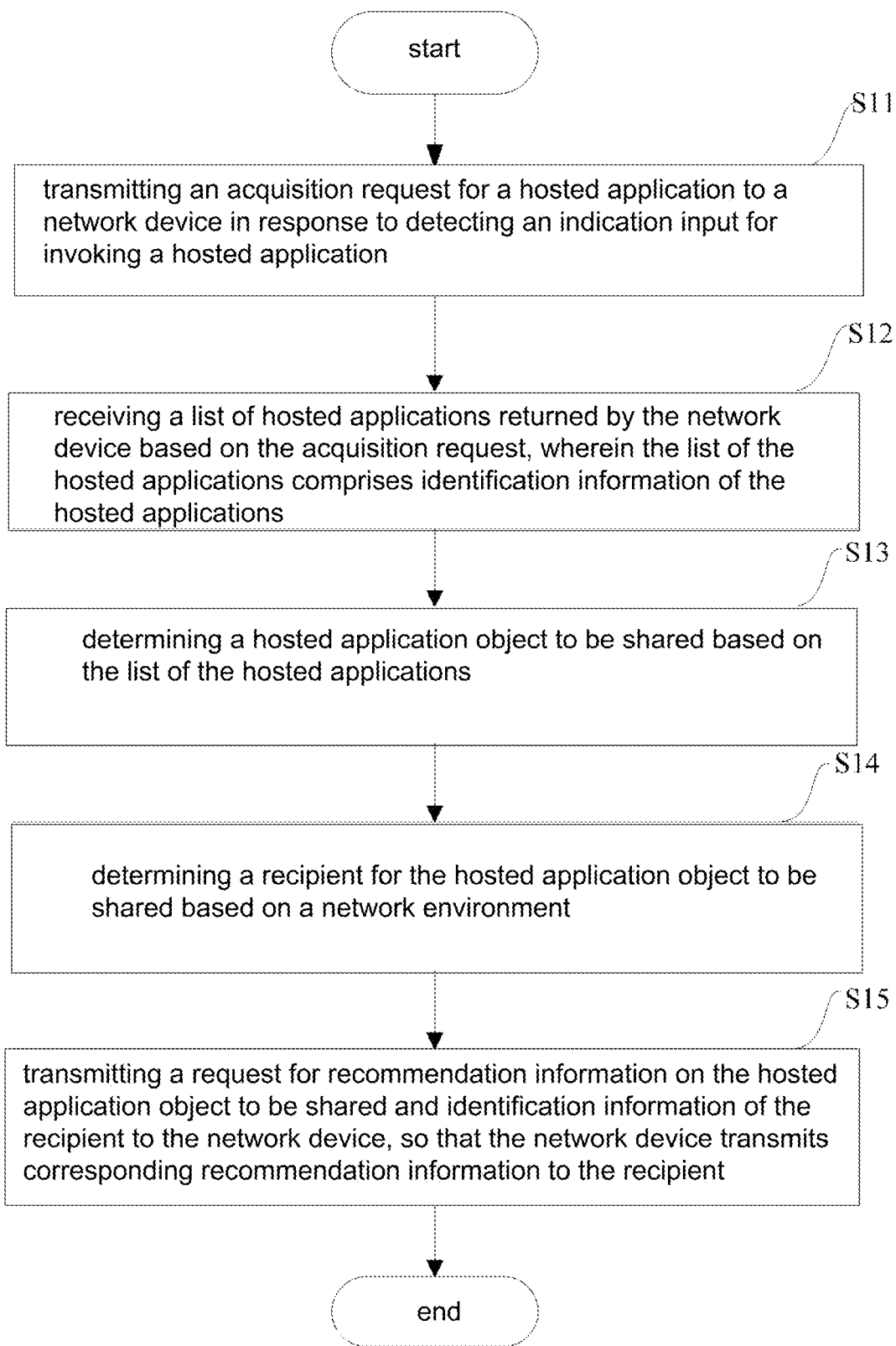
FIG. 1 shows a schematic flowchart of a method for sharing a hosted application at a user equipment provided according to an aspect of the present application.

FIG. 1 shows a schematic flowchart of a method for sharing a hosted application at a user equipment provided according to an aspect of the present application. User equipments include but are not limited to any type of mobile electronic product capable of human-machine interaction with users via touchpads, for example, a smart phone, a PDA, etc. The mobile electronic products can adopt any operating system, such as android operating system, iOS operating system, etc.

As shown in FIG. 1, the method comprises steps S11 to S15. In step S11, in response to detecting an indication input for invoking a hosted application, an acquisition request for a hosted application is transmitted to a network device, wherein the acquisition request comprises identification information of a user corresponding to the user equipment.

In step S12, a list of hosted applications returned by the network device based on the acquisition request is received, wherein the list of the hosted applications comprises identification information of the hosted application. In step S13, a hosted application object to be shared is determined based on the list of the hosted applications. In step S14, a recipient for the hosted application object to be shared is determined based on a network environment. In step S15, a request for recommendation information on the hosted application object to be shared and identification information of the recipient are transmitted to the network device, so that the network device transmits corresponding recommendation information to the recipient, wherein the request for the recommendation information comprises identification information of the hosted application object to be shared. Thus sharing of the hosted application object is directly triggered by detecting the indication input for invoking the hosted application, which simplifies the process for sharing the hosted application and improves users' experience of quickly sharing the hosted application.

Specifically, in step S11, in response to detecting an indication input for invoking the hosted application, an acquisition request for the hosted application is transmitted to a network device, wherein the acquisition request comprises identification information of a user corresponding to the user equipment. The hosted application operates with dependence on its host application, and can realize functions independent of the host application. In some embodiments, the hosted application need not to be installed, and is hosted on its host application for operation. An example of the hosted application may be, for example, an applet which operates and is hosted on WeChat. Accordingly, the host application is an application that has been installed on the user equipment and allows the hosted application to operate with dependence on the host application. Detecting the indication input for invoking the hosted application includes but is not limited to: detecting an input of a preset command identifier, etc. After the preset command identifier is inputted, invoking of the hosted application may be triggered. For example, the user triggers invoking of the hosted application by inputting a specific launch sign or a keyword in a chat session or when editing a message to be posted in a social circle, and transmits an acquisition request for invoking the hosted application to the network device. In order to accurately receive a list of hosted applications corresponding to the acquisition request returned by the network device, the acquisition request needs to comprise identification information of the user corresponding to the user equipment, so that the network device performs matching according to the identification information of the user, wherein the identification information of the user may be account information of an application on which the user is currently logged, such as account information of a social instant messaging application.

Next, in step S12, a list of hosted applications returned by the network device based on the acquisition request is received, wherein the list of the hosted applications comprises identification information of the hosted applications. Here, after triggering the acquisition request for invoking the hosted application, the list of the hosted applications corresponding to the acquisition request returned by the network device is received, wherein the list of the hosted applications comprises identification information of the hosted applications. In some embodiments, the identification information comprises icons, names, etc. corresponding to the hosted applications. Different hosted applications may be distinguished through the identification information for users to choose. The list of the hosted applications returned by the network device may comprise a hosted application, or a plurality of different hosted applications. One or more hosted applications may be hosted applications that have been associated with the identification information of the user. For example, user 1 has been associated with hosted application a and hosted application b when using application A. Then a list of hosted applications returned by the network device that may be received by inputting a launch sign for invoking a hosted application is a list comprising hosted application a and hosted application b. Of course, a hosted application in the list of the hosted applications may also be a hosted application that the user has not been associated with but is determined based on geographic location information, such as a hosted application that may provide services in or near a geographic location where the user is currently located. An hosted application in the list of hosted applications may also be a hosted application that matches a keyword inputted when the hosted application is invoked.

Then, in step S13, a hosted application object to be shared is determined based on the list of the hosted applications. In some embodiments, the hosted application may be chosen according to identification information of the hosted applications in the list of hosted applications. The user equipment determines the chosen hosted application as the hosted application object to be shared. The hosted application object may be related information of the hosted application. For example, the hosted application object is recommendation information of the hosted application itself or page information of a page from the hosted application. The hosted application object to be shared may be determined according to specific operations of the user.

It is necessary to determine a corresponding recipient when sharing a hosted application. In step S14, a recipient for the hosted application object to be shared is determined based on a network environment. Here, the step of determining the recipient may be performed before step S11, or may be performed before, after, or at the same time as step S13. The order for performing the step of determining the recipient is not limited to the order as shown in FIG. 1. The network environment may be determined according to a scenario where the user uses a host application. The specific implementation of selecting a matched recipient according to the network environment may be configured on need. For example, if the network environment is a network environment for chatting, then a friend in chatting may be configured as the recipient.

After determining the hosted application object to be shared and the corresponding recipient, in step S15, a request for recommendation information on the hosted application object to be shared and identification information of the recipient are transmitted to the network device, so that the network device transmits corresponding recommendation information to the recipient, wherein the request for recommendation information comprises identification information of the hosted application object to be shared. Here, a recommendation request for an object that the user wants to recommend and the identification information of the recipient are transmitted to the network device, so that the network device accurately matches recommendation information corresponding to the recommendation request and transmits it to the recipient, so as to complete sharing of the hosted application. The identification information of the recipient may be account information when other users use a host application. Different recipients may be distinguished according to the account information.

In some embodiments of the present application, detecting the indication input for invoking the hosted application comprises at least one of: detecting an input of a command identifier for indicating invoking the list of hosted applications; detecting an input of a command identifier for indicating invoking the list of hosted applications and a keyword inputted in association with the command identifier. Here, the command identifier may include but is not limited to a preset character, such as "#". In some application scenarios of the present application, if a user corresponding to user equipment A wants to invoke a hosted application when using a host application, the user inputs "#" in a dialog input box in a chat or a message editing area for circle of friends. Upon detecting the input of "#", user equipment A responds immediately by invoking a list of hosted applications. Invoking of the hosted application may also be triggered in response to the input of the command identifier and the keyword inputted in association with the command identifier. For example, if a user corresponding to user equipment A wants to invoke a hosted application when using a host application, the user may also input a launch sign "#" in an input box at first, and continue to input a keyword in the input box. Then user equipment A detects "#" and the inputted keyword and in response, transmits a request for acquiring a list of hosted applications to the network device. In some embodiments, as the inputted keyword changes, user equipment A may transmit a request for acquiring the list of hosted applications to the network device several times, so as to change a list of hosted applications that is displayed accordingly in response to the change of the keywords.

In some embodiments of the present application, the list of the hosted applications returned by the network device based on the acquisition request comprises: a search result list of the hosted applications which matches the keyword inputted in association with the command identifier. Here, when the invoking of the list of the hosted applications is triggered by detecting an input of a command identifier and a keyword inputted in association with the command identifier, the network device searches for hosted applications in real time and provides feedback in real time. At this time, the search result may comprise only one hosted application, or may comprise a plurality of hosted applications presented in the form of a search result list.

In some embodiments of the present application, in step S13, the hosted application object to be shared is determined according to a selecting operation by the user of the hosted application in the list of the hosted applications. Here, the user equipment receives the list of the hosted applications returned by the network device. The user chooses the hosted application that he/she wants to share from the list of the hosted applications. The user equipment determines the hosted application object to be shared according to the selecting operation of the hosted application, wherein the hosted application object comprises the hosted application itself or a target page from the hosted application. The user may want to share the hosted application itself, or may want to share a page in the hosted application, for example, to share a product page in a shopping application. Therefore, the selecting operation comprises an operation for selecting the hosted application itself, or an operation for selecting a target page of the hosted application. The user equipment determines whether the selecting operation by the user is an operation for directly selecting the hosted application itself or an operation for selecting a target page of the hosted application, so as to determine whether to share the hosted application itself or the target page of the hosted application.

In some embodiments of the present application, whether the selecting operation by the user is the operation for selecting the target page of the hosted application may be determined in the following way: if an access operation by the user of the identification information of the hosted application in the list of the hosted applications is detected, launching the hosted application corresponding to the access operation; and determining the target page of the hosted application to be shared based on an operation by the user of the launched hosted application. For example, user equipment UA invokes a list of hosted applications where identification information of the hosted applications is displayed, such as icons and names, to facilitate a user to perform a selecting operation by distinguishing different hosted applications according to the icons and names. When the user performs the selecting operation on a hosted application, such as sliding on an icon of the hosted application, the hosted application is launched, and a page is accessed according to the selecting operation by the user of the page in the launched hosted application, and in turn the page of the hosted application that the user wants to share is determined.

Specifically in the above-mentioned determination process, in some embodiments, the access operation comprises at least one of: an operation for accessing the corresponding hosted application by sliding the identification information of the hosted application towards left or towards right; an operation for accessing the corresponding hosted application by clicking thumbnail information corresponding to the identification information of the hosted application, wherein the thumbnail information comprises link information for accessing the target page of the hosted application. For example, after the user invokes a list of hosted applications by inputting "#", the list may only presents icons and names of the hosted applications. When the user slides a display bar where a specific icon or name is located towards left or towards right, the hosted application may be launched, so that the user may access a specific page of the hosted application to share the specific page. In some embodiments, in addition to displaying the icon and the name of the hosted application, thumbnail information of the hosted application is also displayed in the list of the hosted applications. The thumbnail information comprises link information for accessing some pages of the hosted application, such as a homepage of the hosted application or a page with highest frequency of historical use of the hosted application after the hosted application is associated with the user. The page corresponding to the link information is accessed by clicking a thumbnail identification, and thus sharing by the user of contents in the page of the hosted application is achieved.

In some embodiments of the present application, step S14 may be implemented in a way that includes but is not limited to any of the followings:

determining the recipient for the hosted application object to be shared according to an object associated with a current interface of a host application; and determining a corresponding friend list according to the host application chosen by the user, and selecting the recipient for the hosted application object to be shared from the friend list. Here, the recipient may be determined according to the network environment of a host application on which the hosted application is hosted. In some embodiments, the network environment includes but is limited to a current interface of the host application and friends chosen by the user from the friend list of the host application. For example, if the user wants to share a certain hosted application, one or more friends from the friend list of the host application may be selected as the recipient, and recommendation information on the hosted application is transmitted to the chosen friend(s).

In addition, the recipient may also be determined by determining the current interface of the host application. When the current interface of the host application is a chat interface, the recipient may be determined by taking the current chatting object associated with the chat interface as the recipient for the hosted application object to be shared. When the current interface of the host application is an information posting interface, a network object with a permission to browse information posted by the user is taken as the recipient for the hosted application object to be shared. For example, when user A uses a host application, a current interface is a chat interface, and the current chatting object is user B, then user B would be taken as the recipient for recommendation information for the hosted application that user A shares. User A inputs a launch identifier "#" in the dialog box, and then continues to input a keyword to invoke a list of hosted applications, and performs sharing of recommendation information for the hosted application. In addition, if the current interface is an information posting interface, for example, a social platform such as Circle of Friends, Weibo, Blog, Qzone, etc., then the recipient would be a network user with a permission to browse information that the user has posted, such as friends with a friend relationship in Circle of Friends, or friends with permission (which is set by the user) to browse information displayed by the user. Alternatively, the recipient is not limited to a network user with a friend relationship, but can be any network user with account information of the host application and who is able to browse information posted by others in the host application.

In some embodiments of the present application, when the current interface of the host application is the information posting interface, the recommendation information on the hosted application comprises link information of the hosted application. For example, user A uses user equipment UA to edit information to post (such as editing Circle of Friends). If user A inputs a specific sign (such as #) when editing a message, then a list of hosted applications would be invoked for the user to choose, alternatively searching and matching for the hosted application are not performed until the user inputs a name of the hosted application, and then recommendation information on the chosen hosted application is embedded in the posting interface. At this time, the recommendation information on the hosted application comprises link information of the hosted application. The hosted application itself or a specific page of the hosted application may be accessed through the link information. For example, when user A uploads one or more pictures when editing a message in Circle of Friends, and chooses hosted application m, when the edition is completed, the displayed message in Circle of Friends comprises the uploaded one or more pictures and a picture of hosted application m, wherein the picture of hosted application m may be associated with link information of hosted application m.

In some specific scenarios of the present application, user A uses user equipment UA to chat with user B who uses user equipment UB. Upon detecting that user A has inputted a specific sign (such as #) in a dialog box, user equipment UA immediately transmits an acquisition request for invoking a list of hosted applications in response to the specific sign to acquire the list of hosted applications for user A to choose. Alternatively, after user A continues to input a text name of the hosted application after user A inputs the specific sign, the user equipment UA may respond by transmitting a request for invoking a list of hosted applications to the network device, so that the network device searches for hosted applications in real time and returns the list of hosted applications. User A chooses the hosted application itself or accesses a page of the hosted application by sliding a display bar corresponding to identification information of the hosted application towards left or towards right, and transmits relevant information to the hosted application itself or the page of the hosted application to the network device. The network device transmits recommendation information chosen by user A to user B, so that user equipment UB displays the recommendation information in a local chat interface. In some embodiments, if a list of hosted applications acquired by the user equipment UA in response to an input of a command identifier and an input of a keyword contains only one hosted application, then user A may directly choose to share recommendation Information on the only presented hosted application itself. Alternatively, user A performs sharing by performing a launch operation on the only hosted application and operating on the launched hosted application to access a desired page. If the list of hosted applications acquired comprises representation information of a plurality of hosted applications, user A performs selecting from the list. Through the method for sharing the hosted application as described in the present application, user A need not to open the hosted application first and then launch the sharing operation from a sharing entry for the hosted application. Instead, user A directly triggers sharing of the hosted application on a page where the user is making social interaction by inputting a command identifier, which shortens the operation process for sharing the hosted application.

In some other specific scenarios of the present application, when user A uses user equipment UA to edit a message in Circle of Friends, a list of hosted applications is invoked for user A to choose by inputting a command identifier in a edit box by user A, alternatively, real-time searching and matching are not performed until the user inputs a keyword after inputting the command identifier, a list of hosted applications is acquired for the user to choose. User equipment UA embeds recommendation information for the hosted application chosen by user A into the message in Circle of Friends, and thus quick sharing of the hosted application in the posted message is achieved.

Figure 2:
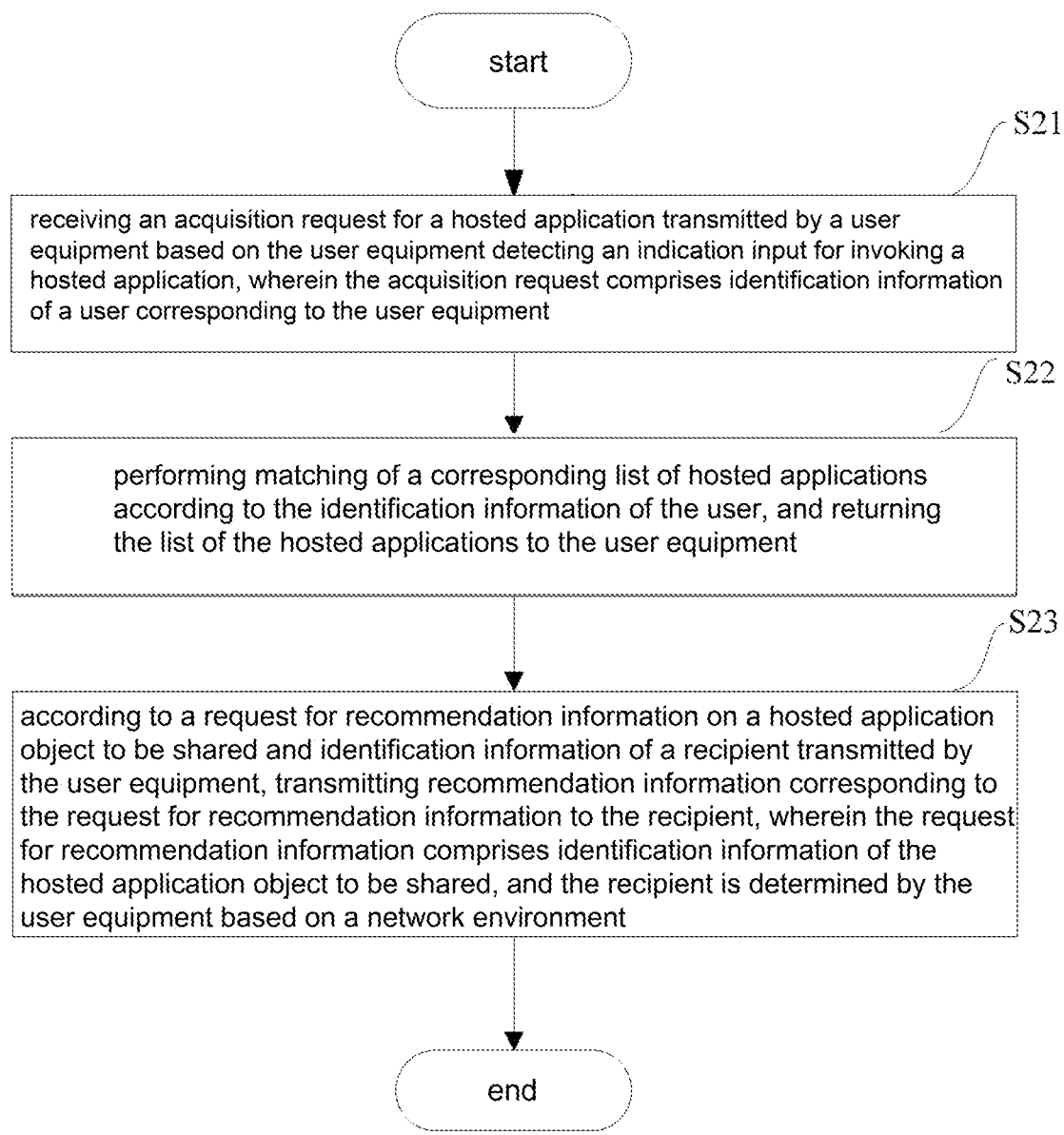
FIG. 2 shows a schematic flowchart of a method for sharing a hosted application at a network device provided according to another aspect of the present application.

FIG. 2 shows a schematic flowchart of a method for sharing a hosted application at a network device provided according to another aspect of the present application. The network device may be a server, or multiple servers connected through a local area network or multiple servers connected through the Internet, or a cloud composed of multiple servers. Here, the cloud is composed of a massive number of computers or network servers based on Cloud Computing, wherein cloud computing is a type of distributed computing, which is a super virtual computer composed of a group of loosely coupled computer sets.

The method of an embodiment as shown in FIG. 2 comprises:

step S21, an acquisition request for a hosted application transmitted by a user equipment based on the user equipment detecting an indication input for invoking a hosted application is received, wherein the acquisition request comprises identification information of a user corresponding to the user equipment. Here, after detecting the indication input for the hosted application, the user equipment responds to the indication input, and transmits an acquisition request for invoking the hosted application to the network device. The network device receives the acquisition request comprising the identification information of the user corresponding to the user equipment, and performs searching and matching, and returns a list of hosted applications to the user corresponding to the identification information. The identification information of the user corresponding to the user equipment may comprise account information used by the user who is currently using the user equipment to log in a host application.

At step S22, matching of a corresponding list of hosted applications is performed according to the identification information of the user, and the list of the hosted applications is returned to the user equipment. Here, the network device performs matching of the corresponding list of the hosted applications according to the identification information of the user. For example, the network device searches for one or more hosted applications historically associated with the identification information of the user according to the identification information, and returns the hosted application that was associated with the user to the user equipment. Alternatively, the network device searches for corresponding hosted applications in real time according to the acquisition request transmitted by the user equipment, and returns a search result to the user equipment.

At step S23, according to a request for recommendation information on a hosted application object to be shared and identification information of a recipient transmitted by the user equipment, recommendation information corresponding to the request for recommendation information is transmitted to the recipient, wherein the request for the recommendation information comprises identification information of the hosted application object to be shared, and wherein the recipient is determined by the user equipment based on a network environment. Here, corresponding recommendation information is accurately matched according to the identification information of the hosted application object to be shared and the identification information of the recipient, and thus the recommendation information is transmitted to the recipient, and then is displayed by the user equipment corresponding to the recipient, for example, in a local chat interface. The identification information of the recipient may be account information when other users use a host application. Different recipients may be distinguished according to the account information.

In an embodiment of the present application, the method further comprises step S20 (not shown), in which hosted applications usage information associated with the user is acquired according to the identification information of the user, wherein the hosted applications usage information comprises information on frequency of historical use and use time; and all of the hosted applications associated with the user are sorted according to the hosted applications usage information to obtain a sorted list of the hosted applications, wherein the list of the hosted applications comprises identification information of the hosted applications. Here, when the network device performs matching and looks for a list of hosted applications corresponding to the acquisition request, it also needs to sort one or more hosted applications located by matching, so as to facilitate the user's selecting. According to account information when the user uses a host application, historical usage information of the hosted applications associated with the account information may be determined, such as information on frequency of historical use and use time. The hosted applications that was associated with the user may be sorted according to the historical usage information to obtain a sorted list of the hosted applications, which is closer to users' inclination of choice, thereby facilitating the user to quickly choose his/her preferred hosted applications and reducing time for searching for a target hosted application. It can be understood that sorting matched hosted applications according to usage information of the associated hosted applications as mentioned above is merely an example. The hosted applications in the list of the hosted applications may also be sorted according to other methods.

In some embodiments of the present application, the indication input for invoking the hosted application comprises an input of a command identifier for indicating invoking the list of the hosted applications. Here, the command identifier may be a preset launch sign, such as "#".

In addition, the indication input for invoking the hosted application may also comprise an input of a command identifier for indicating invoking the list of the hosted applications and a keyword inputted in association with the command identifier. For example, if user A corresponding to user equipment UA wants to invoke a hosted application when using a host application, user A may also input a launch sign "#" in an input box at first, and continue to input a keyword in the input box. Then user equipment A detects "#" and the inputted keyword and responds. The network device receives a request for acquiring a list of hosted applications transmitted by user equipment A. Further, in step S22, matching of a corresponding search result list of the hosted applications is performed according to the identification information of the user and the keyword inputted in association with the command identifier. When the indication input for invoking the hosted application is an input of a command identifier for indicating invoking the list of the hosted applications and the keyword inputted in association with the command identifier, the network device searches for the hosted application in real time according to the inputted keyword, and provides feedback in real-time.

In some embodiments of the present application, the present application also provides a computer readable medium having computer readable instructions stored thereon, the computer readable instructions being executable by a processor to implement the above-mentioned methods.

In addition, according to another aspect of the present application, it is also provided a user equipment for sharing a hosted application. The user equipment comprises:
one or more processors; and
a memory storing computer readable instructions, wherein the computer readable instructions, when executed, cause the processor to perform the operations of the method for sharing a hosted application at a user equipment as mentioned above. For example, the computer readable instructions, when executed, cause the one or more processors to: transmit an acquisition request for the hosted application to a network device in response to detecting an indication input for invoking the hosted application, wherein the acquisition request comprises identification information of a user corresponding to the user equipment; receive a list of hosted applications returned by the network device based on the acquisition request, wherein the list of the hosted applications comprises identification information of the hosted applications; determine a hosted application object to be shared based on the list of the hosted applications; determine a recipient for the hosted application object to be shared based on a network environment; transmit a request for recommendation information on the hosted application object to be shared and identification information of the recipient to the network device, so that the network device transmits corresponding recommendation information to the recipient, wherein the request for recommendation information comprises identification information of the hosted application object to be shared.

According to yet another aspect of the present application, it is also provided a network device for sharing a hosted application. The network device comprises:
one or more processors; and
a memory storing computer readable instructions, wherein the computer readable instructions, when executed, cause the processor to perform the operations of the method for sharing a hosted application at a network device as mentioned above.

For example, the computer readable instructions, when executed, cause the one or more processors to:
receive an acquisition request for the hosted application transmitted by a user equipment based on the user equipment detecting an indication input for invoking the hosted application, wherein the acquisition request comprises identification information of a user corresponding to the user equipment;
perform matching of a corresponding list of hosted applications according to the identification information of the user, and return the list of the hosted applications to the user equipment;
according to a request for recommendation information on a hosted application object to be shared and identification information of a recipient transmitted by the user equipment, transmit recommendation information corresponding to the request for recommendation information to the recipient, wherein the request for recommendation information comprises identification information of the hosted application object to be shared, and the recipient is determined by the user equipment based on a network environment.

Obviously, those skilled in the art can make various modifications and variations to the present application without departing the spirit and scope of the present application. In this way, if these modifications and variations of the present application fall within the scope of the claims of the present application and equivalent technologies thereof, the present application is also intended to encompass these modifications and variations.

It should be noted that the present application can be implemented in software and/or a combination of software and hardware, for example, by using an application specific integrated circuit (ASIC), a general purpose computer, or any other similar hardware device. In one embodiment, the software program of the present application can be executed by a processor to implement the steps or functions described above. Likewise, the software programs (including related data structures) of the present application can be stored in a computer readable storage medium such as a RAM memory, a magnetic or optical drive or a floppy disk and the like. In addition, some of the steps or functions of the present application may be implemented in hardware, for example, as a circuit that cooperates with a processor to perform various steps or functions.

In addition, a portion of the present application can be embodied as a computer program product, such as computer program instructions, when executed by a computer, can invoke or provide a method and/or technical solution in accordance with the present application. The program instructions for invoking the method of the present application may be stored in a fixed or removable storage medium, and/or transmitted by a data stream in a broadcast or other signal carrier medium, and/or stored in a working memory of the computer device in which the program instructions run. Herein, an embodiment in accordance with the present application includes an apparatus including a memory for storing computer program instructions and a processor for executing program instructions, wherein when the computer program instructions are executed by the processor, triggering the apparatus to operate the above-mentioned methods and/or technical solutions in accordance with various embodiments of the present application.

For those skilled in the art, it is apparent that the present application is not limited to the details of the above-mentioned exemplary embodiments, and the present application can be implemented in other specific forms without departing the spirit or basic features of the present application. Therefore, the present embodiments are to be considered as illustrative and not restrictive. The scope of the present application is defined by the appended claims rather than the above-mentioned description, and therefore it is intended that all changes which fall within the meaning and range of equivalency of the claims are embraced in the present application. Any reference signs in the claims should not be construed as limiting the claims involved. In addition, it is apparent that the word "comprising" does not exclude other elements or steps, and the singular does not exclude the plural. A plurality of units or means stated in the apparatus claims may also be implemented by one unit or means by means of software or hardware. The terms first and second and the like are used to represent names and do not represent any particular order.

What is claimed is:

1. A method for sharing a hosted application at a user equipment, the method comprising:
    transmitting an acquisition request for a hosted application to a network device in response to detecting an indication input for invoking a hosted application, wherein the acquisition request comprises identification information of a user corresponding to the user equipment;
    receiving a list of hosted applications returned by the network device based on the acquisition request, wherein the list of the hosted applications comprises identification information of the hosted applications;
    determining a hosted application object to be shared based on the list of the hosted applications;
    determining a recipient for the hosted application object to be shared based on a network environment, wherein the network environment is a current interface of the hosted application; and
    transmitting a request for recommendation information on the hosted application object to be shared and identification information of the recipient to the network device, so that the network device transmits corresponding recommendation information to the recipient, wherein the request for recommendation information comprises identification information of the hosted application object to be shared.

2. The method according to claim 1, wherein the step of detecting the indication input for invoking a hosted application comprising at least one of: detecting an input of a command identifier for indicating invoking a list of hosted applications; and detecting an input of a command identifier for indicating invoking a list of hosted applications and a keyword inputted in association with the command identifier.

3. The method according to claim 2, wherein the list of the hosted applications returned by the network device based on the acquisition request comprises: a search result list of the hosted applications which matches the keyword inputted in association with the command identifier.

4. The method according to claim 1, wherein the step of determining a hosted application object to be shared based on the list of the hosted applications comprising: determining the hosted application object to be shared according to a selecting operation by the user of the hosted application in the list of the hosted applications.

5. The method according to claim 4, wherein the hosted application object comprises the hosted application itself or a target page from the hosted application.

6. The method according to claim 4, wherein the selecting operation comprises an operation for selecting the hosted application itself or an operation for selecting a target page of the hosted application.

7. The method according to claim 4, wherein the step of determining the hosted application object to be shared according to the selecting operation by the user of the hosted application in the list of the hosted applications comprising: if an access operation by the user of identification information of the hosted application in the list of the hosted applications is detected, launching the hosted application corresponding to the access operation; and determining a target page of the hosted application to be shared based on an operation by the user of the launched hosted application.

8. The method according to claim 7, wherein the access operation comprises at least one of: an operation for accessing the corresponding hosted application by sliding the identification information of the hosted application towards left or towards right; and an operation for accessing the corresponding hosted application by clicking thumbnail information corresponding to the identification information of the hosted application, wherein the thumbnail information comprises link information for accessing the target page of the hosted application.

9. The method according to claim 1, wherein the step of determining the recipient for the hosted application object to be shared based on the network environment comprising any one of: determining the recipient for the hosted application object to be shared according to an object associated with a current interface of a host application; and determining a corresponding friend list according to the host application chosen by the user, and selecting the recipient for the hosted application object to be shared from the friend list.

10. The method according to claim 9, wherein the step of determining the recipient for the hosted application object to be shared according to an object associated with a current interface of the host application comprising: when the current interface of the host application is a chat interface, taking the current chatting object associated with the chat interface as the recipient for the hosted application object to be shared; and when the current interface of the host application is an information posting interface, taking a network object with a permission to browse information posted by the user as the recipient for the hosted application object to be shared.

11. The method according to claim 10, wherein when the current interface of the host application is the information posting interface, the recommendation information on the hosted application comprises link information on the hosted application.

12. A method for sharing a hosted application at a network device, the method comprising:
    receiving an acquisition request for a hosted application transmitted by a user equipment based on the user equipment detecting an indication input for invoking a hosted application, wherein the acquisition request comprises identification information of a user corresponding to the user equipment;
    performing matching of a corresponding list of hosted applications according to the identification information of the user, and returning the list of the hosted applications to the user equipment; and according to a request for recommendation information for a hosted application object to be shared and identification information of a recipient transmitted by the user equipment, transmitting recommendation information corresponding to the request for recommendation information to the recipient, wherein the request for recommendation information comprises identification information of the hosted application object to be shared, and the recipient is determined by the user equipment based on a network environment, wherein me network environment is a current interface or the hosted application.

13. The method according to claim 12, wherein before performing matching of the corresponding list of hosted applications according to the identification information of the user, the method further comprising: acquiring hosted applications usage information associated with the user according to the identification information of the user, wherein the hosted applications usage information comprises information on frequency of historical use and use time; and sorting all of the hosted applications associated with the user according to the hosted applications usage information to obtain a sorted list of the hosted applications, wherein the list of the hosted applications comprises identification information of the hosted applications.

14. The method according to claim 12, wherein the indication input for invoking a hosted application comprises: an input of a command identifier for indicating invoking the list of hosted applications.

15. The method according to claim 12, wherein the indication input for invoking a hosted application comprises: an input of a command identifier for indicating invoking the list of hosted applications and a keyword inputted in association with the command identifier; wherein the step of performing matching of the corresponding list of the hosted applications according to the identification information of the user comprising: performing matching of a corresponding search result list of the hosted applications according to the identification information of the user and the keyword inputted in association with the command identifier.

16. The method according to claim 12, wherein the hosted application object comprises the hosted application itself or a target page from the hosted application.

17. A user equipment for sharing a hosted application, the user equipment comprising:
one or more processors; and
a memory storing computer readable instructions, wherein the computer readable instructions, when executed, cause the processor to perform the following operations:
transmitting an acquisition request for a hosted application to a network device in response to detecting an indication input for invoking a hosted application, wherein the acquisition request comprises identification information of a user corresponding to the user equipment;
receiving a list of hosted applications returned by the network device based on the acquisition request, wherein the list of the hosted applications comprises identification information of the hosted applications;
determining a hosted application object to be shared based on the list of the hosted applications;
determining a recipient for the hosted application object to be shared based on a network environment, wherein the network environment is a current interface of the hosted application; and
transmitting a request for recommendation information on the hosted application object to be shared and identification information of the recipient to the network device, so that the network device transmits corresponding recommendation information to the recipient, wherein the request for recommendation information comprises identification information of the hosted application object to be shared.

* * * * *